United States Patent
Weissenberg

[15] 3,638,527
[45] Feb. 1, 1972

[54] INDEXING FIXTURE
[72] Inventor: Bruno Weissenberg, Valhalla, N.Y.
[73] Assignee: Wood Industries, Inc., Plainfield, N.J.
[22] Filed: Oct. 20, 1969
[21] Appl. No.: 867,521

[52] U.S. Cl. ..............................90/57, 82/40, 90/DIG. 24, 33/181 R, 33/213, 408/71
[51] Int. Cl. .......................................................B23f 23/08
[58] Field of Search.....................90/57, DIG. 24, 56; 279/5; 33/181, 207, 213, 214; 82/40; 77/64

[56] References Cited
UNITED STATES PATENTS
2,671,274  3/1954  Greenberger..........................33/181 R Primary Examiner—Gil Weidenfeld
Attorney—Pennie, Edmonds, Morton, Taylor and Adams

[57] ABSTRACT

The fixture has a conventional three-clamp scroll chucking device for clamping it at the end of a shaft or a pinion, and a dial attached to this device. A vernier plate with a water level or a similar leveling means is rotatably mounted on the dial plate for precisely indexing the shaft or pinion to which the device is attached, to any required angular setting for machining operations on the shaft or pinion such as milling, drilling, planing and the like operations.

4 Claims, 3 Drawing Figures

PATENTED FEB 1 1972
3,638,527
FIG.1
FIG.2
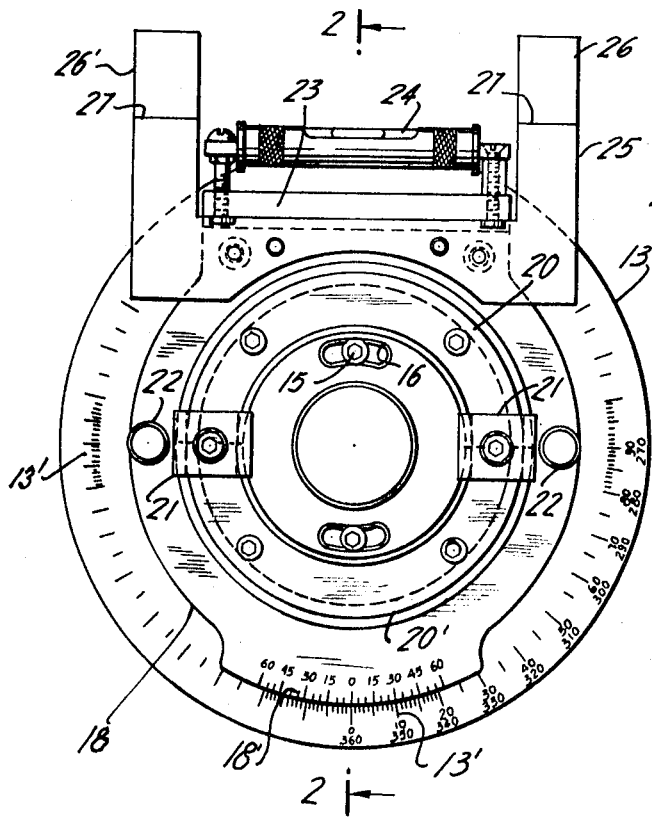
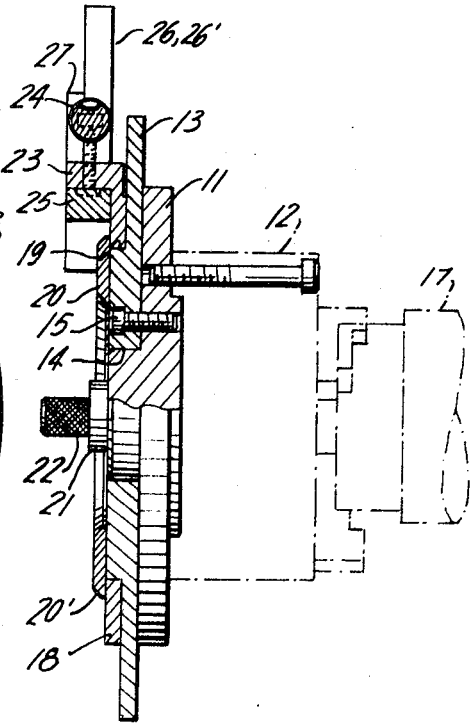
FIG.3
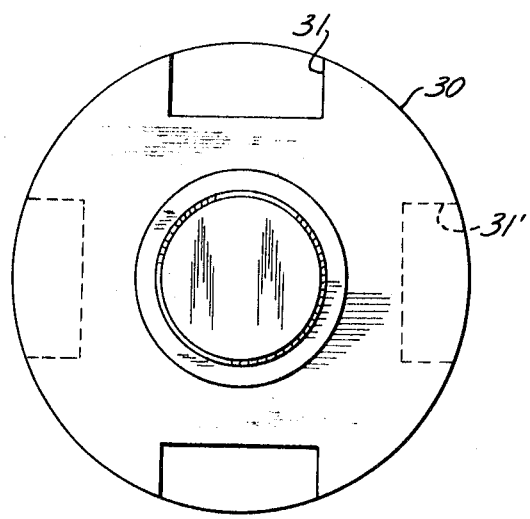
INVENTOR.
BRUNO WEISSENBERG
BY
ATTORNEY

INDEXING FIXTURE

BACKGROUND OF THE INVENTION

The invention relates to machine tool fixtures in general and to indexing devices for workpieces on machine tools in particular.

It is frequently necessary to perform machining operations on shafts, rollers or objects of substantially cylindrical shape, such as milling of axially extending grooves, planing of flats, drilling of radial holes or the like in specified angular relationships to one another. It is the common practice to lay out the locations of such grooves, flats, or holes on the workpieces and to mark the places by "scribing" before the actual setting of the cutting tools and the machining can be started. When the places of such operations on a workpiece are specified in certain angular relationships to reference centerlines or faces in the design of such a workpiece, or in case of multiple equal operations in relative angular positions to one another, laying out and scribing of the precise locations is a time-comsuming job which requires great skill, experience and careful attention from the trained craftsman. It is in the interest of expediting production procedures to have time and laborsaving tools and fixtures to make this job a more dependable and timesaving operation, eliminating the steps to be taken by the heretofore used methods.

This invention solves the problem.

SUMMARY

The invention consists in such novel features, construction arrangements, combinations of parts and improvements as may be shown and described in connection with the apparatus herein disclosed by way of example only and as illustrative of a preferred embodiment.

The invention has been conceived for improving the procedure of properly setting up of a workpiece, on which various machining operations are to be performed, particularly operations at various angles relative to one another on the workpiece.

Objects and advantages of the invention will be set forth in part hereafter and in part will be obvious herefrom or may be learned by practicing the invention, the same being realized and attained by means of the instrumentalities and combinations pointed out in the appended claims.

It is an object of the invention to provide an indexing fixture for setting a workpiece on a machine tool at predetermined angles for preparing said workpiece for machining operations to be performed thereon at such predetermined angles.

It is a further object of the invention to provide a tooling fixture which can be readily clamped onto the end of a shaft or of a shaft end of a cylindrical workpiece.

Another object of the invention is to provide a fixture which is uncomplicated and easy to operate, yet is a very precise instrument.

Various further and more specific purposes, features and advantages will clearly appear from the detailed description given below taken in connection with the accompanying drawing which forms part of the specification and illustrates merely by way of example one embodiment of the device of the invention.

BRIEF DESCRIPTION OF THE DRAWING

In the following description and in the claims, parts will be identified by specific names for convenience, but such names are intended to be as generic in their application to similar parts as the art will permit. Like reference characters denote like parts in the figures of the drawing, in which FIG. 1 shows the front view of the device, FIG. 2 is a section of the device, taken along the line 2—2 in FIG. 1, partly broken away;

FIG. 3 is a schematic end view of a typical plate cylinder of a rotary printing machine.

DESCRIPTION OF THE PREFERRED EMBODIMENT

Referring now in more detail to the drawing illustrating a preferred embodiment by which the invention may be realized, there is in FIG. 1 and 2 a mounting plate 11 which is fixedly attached to a conventional three-clamp scroll chuck 12. A dial plate 13 having angle graduations 13' thereon is rotatably mounted with two screws 15 on a centering boss 14 protruding from plate 11. Dial plate 13 has two elongated boltholes 16 for screw 15, so that it may be possible to adjust dial plate 13 with respect to the position of chuck 12 on a workpiece 17. A vernier plate 18 with a vernier graduation 18' thereon is rotatably held on a centering protrusion 19 of dial plate 13 and is kept thereon in place by two retainer ring halves 20, 20'. Vernier plate 18 is clamped firmly on the face of dial plate 13 by clamps 21 after "setting" of the former by rotating it on the latter. Handles 22 on a vernier plate 18 facilitate rotating thereof. A narrow horizontal shelf 23 is formed on the upper edge of vernier plate 18, on which a conventional water level 24 is fastened. A U-shaped bracket 25 is attached at the upper part of vernier plate 18, with the two free ends 26, 26' extending upwardly at the ends of water level 24. On both ends 26, 26' a step 27 is machined which serves as a precise reference line at a specified distance from the centerline of the fixture, facilitating the adjusting of the machining tool.

OPERATION OF THE FIXTURE

When machining operations are to be performed on a substantially cylindrical body such as a printing machine cylinder 30 (FIG. 3), for example of milling of grooves 31 which are staggered at an angle on the periphery of such a cylinder, the fixture is clamped on shaft end 17 of the cylinder by three-clamp scroll chuck 12. By unlocking screws 15 it is possible to set dial plate 13 with locked vernier plate 18 thereon precisely horizontally at "zero" with the help of water level 24 or with dial indicators placed on horizontal shelf 23. After the first machining operation, for example of milling of groove 31, has been accomplished, vernier plate 18 is set to the desired angle on dial 13'. Cylinder 30 is now rotated in its supports on the milling machine until water level 24 indicates again the horizontal position, or this position is indicated by dial indicators placed on shelf 23. Groove 31' is now ready for being milled at the precise angle from groove 30. The use and operation of the fixture is described by way of example showing as to how precise production operations can be performed in desired sequences in a very economical and uncomplicated manner.

While the invention has been described and illustrated with respect to a certain preferred example which gives satisfactory results, it will be understood by those skilled in the art after understanding the principle of the invention, that various other changes and modifications may be made without departing from the spirit and scope of the invention.

What I claim as my invention is:

1. An indexing fixture to be clamped at the end of a rotatable workpieces for setting the latter to precise positions for performing machining operations thereon, said fixture having a mounting plate and a three-clamp scroll chuck on said mounting plate, said fixture comprising a dial plate adjustably rotatably mounted on said mounting plate, said dial plate having angle graduations thereon, a vernier plate rotatably held in place on said dial plate, said vernier plate having angle graduations thereon, releasable clamping means on said dial plate for holding said vernier plate in any desired angular position on said dial plate, and level-indicating means attached to said vernier plate and to one side of the center of rotation of said vernier plate.

2. An indexing fixture according to claim 1, said dial plate having elongated boltholes for adjusting said indexing fixture to the precise horizontal level position thereof after said fixture had been clamped on the free end of said workpiece.

3. An indexing fixture according to claim 1, and a horizontally arranged shelf on the upper part of said vernier plate and a water level attached to said shelf.

4. An indexing fixture to be clamped at the end of a workpiece for setting the latter to precise positions for performing machining operations thereon, said fixture having a mounting plate and a three-clamp scroll chuck on said mounting plate, said fixture comprising a dial plate having angle graduations thereon, a vernier plate rotatably held in place on said dial plate, said vernier having angle graduations thereon, releasable clamping means on said dial plate for holding said vernier plate in any desired angular position on said dial plate, level indicating means attached to said vernier plate, and a U-shaped bracket attached to the upper part of said vernier plate, said bracket having free ends extending upwardly from said upper part of said vernier plate, and said ends having steps thereon constituting reference lines at a predetermined fixed distance from the center of said fixture.

* * * * *

PO-1050
(5/69)

UNITED STATES PATENT OFFICE
CERTIFICATE OF CORRECTION

P-1294

Patent No. 3,638,527     Dated February 1, 1972

Inventor(s) Bruno Weissenberg

It is certified that error appears in the above-identified patent and that said Letters Patent are hereby corrected as shown below:

Column 2, line 59, delete "workpieces" and substitute in place thereof --workpiece--;

Column 2, line 73, delete "boltholes" and substitute in place thereof --bolt holes--;

Column 3, line 8, insert after "dial plate" --adjustably mounted on said mounting plate, said dial plate --.

Signed and sealed this 4th day of July 1972.

(SEAL)
Attest:

EDWARD M. FLETCHER, JR.                ROBERT GOTTSCHALK
Attesting Officer                       Commissioner of Patents